United States Patent
Hara

(10) Patent No.: US 8,157,568 B2
(45) Date of Patent: Apr. 17, 2012

(54) OPHTHALMOLOGIC MODEL

(76) Inventor: Tsutomu Hara, Utsunomiya (JP)

( * ) Notice: Subject to any disclaimer, the term of this patent is extended or adjusted under 35 U.S.C. 154(b) by 453 days.

(21) Appl. No.: 12/125,465

(22) Filed: May 22, 2008

(65) Prior Publication Data

US 2009/0291423 A1 Nov. 26, 2009

(51) Int. Cl.
*G09B 23/28* (2006.01)
(52) U.S. Cl. ............ 434/271; 434/262; 434/267
(58) Field of Classification Search ............ 434/271, 434/262, 267; 351/159, 177
See application file for complete search history.

(56) References Cited

U.S. PATENT DOCUMENTS

| | | | |
|---|---|---|---|
| 5,387,106 A * | 2/1995 | Mackenzie et al. | 434/271 |
| 5,893,719 A * | 4/1999 | Radow | 434/271 |
| 6,485,142 B1 * | 11/2002 | Sheehy et al. | 351/203 |
| 6,789,898 B2 * | 9/2004 | Le Saux et al. | 351/159 |
| 6,830,332 B2 * | 12/2004 | Piers et al. | 351/159 |
| 6,887,083 B2 * | 5/2005 | Umeyama et al. | 434/271 |
| 6,902,404 B2 * | 6/2005 | Johnson, Jr. | 434/271 |
| 2002/0028429 A1 * | 3/2002 | Umeyama et al. | 434/271 |
| 2003/0107706 A1 * | 6/2003 | Rubinstein et al. | 351/177 |
| 2009/0004636 A1 * | 1/2009 | Carda et al. | 434/271 |

FOREIGN PATENT DOCUMENTS

| | | |
|---|---|---|
| JP | H5-096865 A | 12/1993 |
| JP | 3024888 | 3/1996 |
| JP | 2003-195741 A | 7/2003 |

OTHER PUBLICATIONS

3B Scientific, Instruction Manual and design of Product, 2005.*
Netter, Frank, Atlas of Human Anatomy 4th Edition, Jan. 2006 pp. 87-91.*
Gray's Anatomy Plate, retrieved from <http://en.wikipedia.org/wiki/Schlemm%27s_canal> and <http://en.wikipedia.org/wiki/Annulus_of_Zinn>, original date Feb. 2006.*
Wikipedia, Trabeculectomy, retrieved from <http://en.wikipedia.org/wiki/Trabeculectomy> revision Feb. 2008.*
Eye Health Center, Scleral buckling surgery for retinal detachment, May 2007, retrieved from waybackmachine.org.*

* cited by examiner

*Primary Examiner* — Kang Hu
(74) *Attorney, Agent, or Firm* — Rothwell, Figg, Ernst & Manbeck, P.C.

(57) ABSTRACT

An ophthalmologic ball model having a set of ocular parts of a human anatomy comprises of molded components of a ductile resin such as soft silicone, polyurethane resin, fluorine resin, synthetic rubber, natural rubber or a combination of these resins; said parts are transparent or are colored and are patterned; said parts are in a solid form or a sheet form which can be attachable or removable; and such a structure is adopted as a model as to be transformed by pressure.

2 Claims, 5 Drawing Sheets

(a)

(b)

(c)

OPHTHALMOLOGIC MODEL

BACKGROUND OF THE INVENTION

1. Field of the Invention

This invention relates to an ophthalmologic model being used for explanation of an intraocular disease or an operative method in a case of an intraocular surgery.

2. Description of the Related Art

Traditionally, several ophthalmologic models have been used for explanation of an operative method of an ocular surgery for a patient of an intraocular disease. However, it is difficult to explain substantially a detailed ocular operative method for the patient and family before the surgery, because a present ophthalmologic model is made of hard materials. Furthermore, these ophthalmologic models are arranged in a healthy eye configuration so that the patient cannot understand explicitly individual symptoms and condition of the disease, and in many cases the patient receives medical treatment with anxiety.

Therefore, several techniques have been proposed in order to solve these problems. For example, a proposal as 'an ophthalmologic model for educational guidance of retinopathia diabetic for a diabetic patient' (Japanese Patent Application Laid-Open No. 2003-195741) in which condition of symptoms in the case of retinopathia diabetic can be studied visually by using plural ophthalmologic models, or 'a crystal lens model' (Japanese Utility Model Application Laid-Open No. H5-096865) in which an intraocular lens model is constructed such as to be attached and removed freely as a human crystal lens, or 'a model eye using a water cistern' (Japanese Registered Utility Model No. 3,024,888) in which appearance of projection of incident light into water can be monitored by using models of a cornea, an intraocular lens and a retina, have been proposed. However, these proposals are good for explanation of the healthy eye configuration or of outline of the disease, and by these ophthalmologic models it is difficult to say that the patient can deepen understanding of explanation of an operative method, such as, explanation of symptoms of the sick part of the body for which the patient has particular anxiety, necessity of surgery, surgical technique, surgical degree of difficulty etc.

SUMMARY OF THE INVENTION

Concerning these problems, a present invention intends to provide an ophthalmologic model being used for explanation of an operative method of surgery in a case of an intraocular disease.

In order to achieve said intention, the present invention provides an ophthalmologic model having a same form of an eye of a human anatomy which comprises of constitutive parts wherein said parts are mold of a soft ductile resin; said parts are transparent or are colored and are patterned; said parts can be connected or disconnected by forming to be in a solid form or a sheet form; and structure of the model can be transformed by pressure.

Additionally, said ductile resin may be selected from a silicone resin, a polyurethane resin, a fluorine resin, a synthetic rubber, a natural rubber or a combination of these resins.

By the ophthalmologic model of the present invention, advantageous effects described below will be achieved. Explanation as to disease symptoms of the patient, necessity of surgery, surgical technique, procedural steps, appearance of diseased part after surgery, can be made realistically by using the ophthalmologic model of the present invention, so, patient's anxiety against surgery can be removed preliminary, fully understanding of the patients can be expected, and a possibility of complications or aftereffects can be explained totally.

Furthermore, by the ophthalmologic model of the present invention, difference between normal structure of ocular parts and symptoms of diseased area is understandable just by looking, because that all ocular parts consisting the ophthalmologic model are made of soft silicone or acrylic resin and can transform into a various configuration by a pressure, and can be distinguished individually by using a transparent part, a colored part, a patterned part with capillary pattern, as described later. Furthermore, as to a structure wherein an ocular part is built in other ocular part, the parts can be transformed in order to be inserted or disconnected before patient's face, so it is possible to show an approximated method of an actual operative method before patient's face, then, there is an effect that patient's fully understanding can be obtained as to surgery which is complicated and has high difficulty level.

Additionally, since the ocular parts are separately distinguished such as a transparent part, a colored part and a capillary patterned part by the ophthalmologic model of the present invention, such an effect can be expected that at a glance we can understand that the ocular parts are constructed in close relation to each other of an individual part and its surrounding parts.

Further additionally, by the ophthalmologic model of the present invention, each adjacent contact members of ocular parts are adapted to engage each other by each concavity portion and convexity portion or by using a sheet fastener, or are retained in a cohering state by viscosity of a material such as silicone resin and so on in a sheet form, and are able to be connected or to be disconnected easily, and a layer of film can also be scaled into the form of plural lamina.

Moreover, by the ophthalmologic model of the present invention, because it is a mold of a soft ductile material, it is possible to draft corpus vitreum by pulling a string in the case of explanation of causality of and an operative method against retinal detachment, and condition of retinal detachment can be demonstrated realistically by using this model. As for an explanation of a suprascleral buckling procedure, for example, it is possible that outer wall of an eye is caved inwardly by using a compressing substance against the outer wall, only when a soft ophthalmologic model is used. Additionally, explanation of condition to make a detached part of sclera contact with inner wall of sclera by gas pressure which is caused by introducing a gas into eyeball for the sake of intraocular treatment of retinal detachment or various vitreous surgeries is facilitated. And explanation of meaning or necessity of flat position after surgery in order to accelerate autogenous healing is also facilitated. By the way, though it is not shown in the drawings, an embodiment using a filling apparatus to fill up with a fluid such as a gas may be adopted. When such embodiment is adopted, a present condition of patient's eyeball or a condition after surgery and so on can be replicated dynamically by transformation of ocular parts with regulating a pressure in said filling apparatus, and it is possible to deepen patient's understanding.

And additionally, by the ophthalmologic model of the present invention, it is possible to replicate a condition wherein water is pooled in an eye of a patient with glaucoma, and it is possible to display visually the fact that vision disorder has been caused by increased ocular pressure because of insufficient discharge of water which is pooled in the eye, then, patient can understand more accurately the condition of eyeball owing to his disease. Furthermore, on explanation of operative method against these conditions, such as, trabeculectomy, there is an effect that the patient can understand easily the method for preparing bypass to discharge water and the method for controlling aqueous fluid secreted intraoculally. Additionally, in these operative method, outer layer, middle layer and inner layer of eyeball are stripped off or removed by separating into several layers, then only theoretical explanation is possible by using a conventional ophthalmologic model which is constructed with hard materials, but by using the soft ophthalmologic model of the present invention, condition of stripping or ablation can be displayed visually, it is possible to give enough explanation to the patient.

And additionally, by the ophthalmologic model of the present invention, ocular parts are replicated accurately, it is possible to accommodate for explanation not only of present operative method but also of an operative method which will be adopted in future, for example, combination of equatorial ring inside of capsula lentis and intraocular lens or an operative method which will be developed newly in future, so that advantageous effect can be expected by comparing to the case using conventional ophthalmologic model made of resin etc.

DETAILED DESCRIPTION OF THE INVENTION

The present invention relates to the ophthalmologic model 1 being used for explanation for the patient and being constructed with ocular parts made of a soft ductile resin. Said ocular parts has same form as ocular parts of human anatomy, is transparent or colored and patterned, is formed as individual part or sheet form, and is possible to be connected or to be disconnected by its viscosity, its concavity portion and convexity portion or using sheet fastener and so on. Furthermore, it is the greatest characteristic that said ophthalmologic model has a structure which is transformed by pressure. Hereafter, an embodiment of the ophthalmologic model 1 of the present invention is explained by using drawings.

Figure 1:
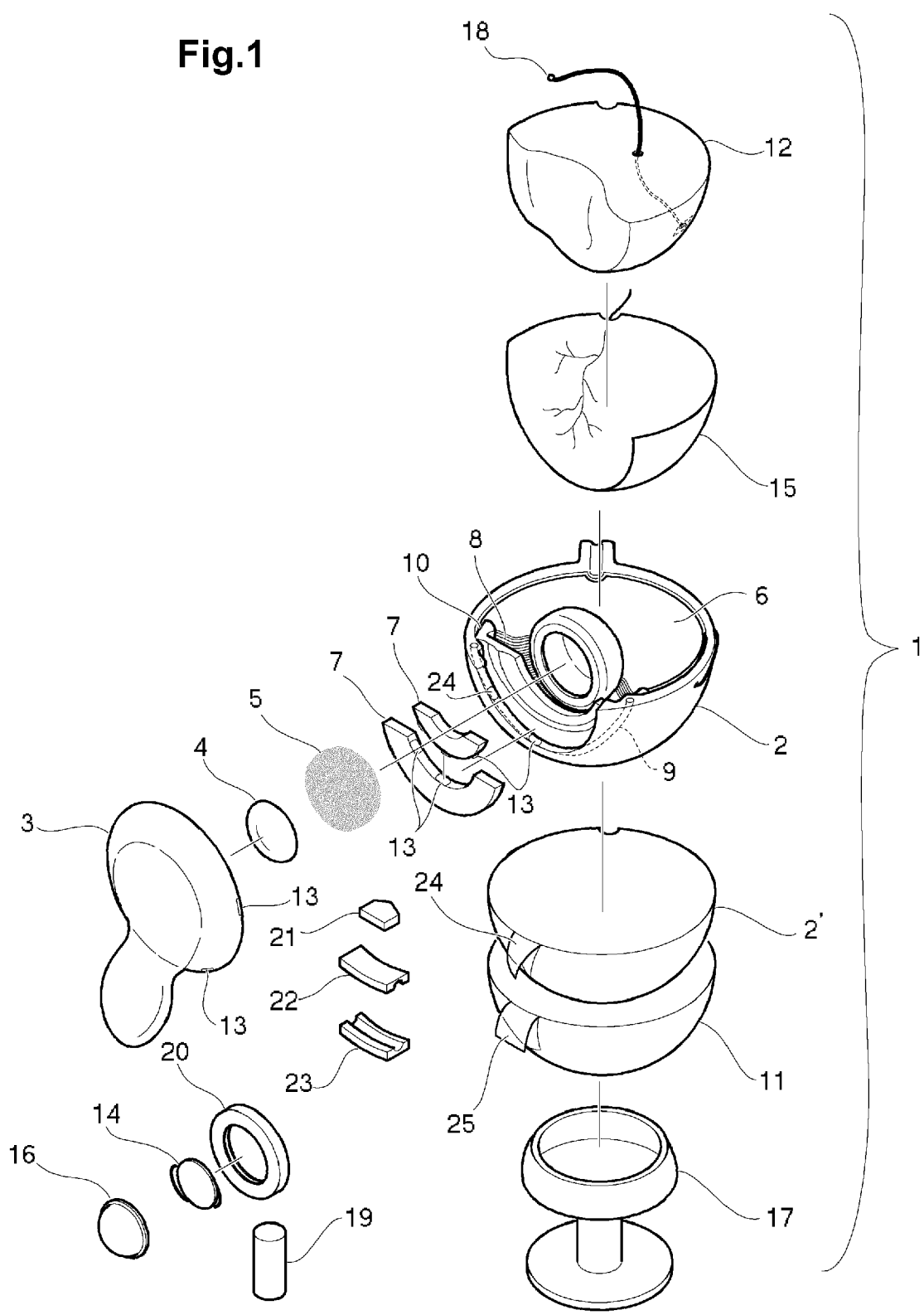
FIG. 1 is a half sectional exploded perspective view of the ophthalmologic model of the present invention.
Figure 2:
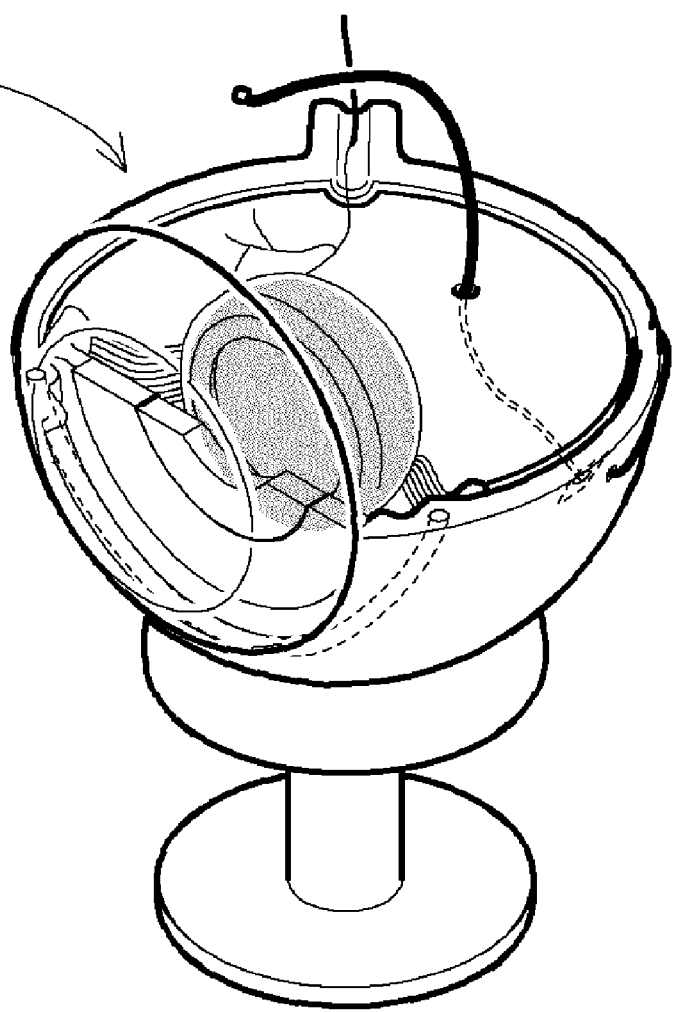
FIG. 2 is a whole perspective view of the ophthalmologic model of the present invention.

Component parts of the ophthalmologic model 1 of the present invention are shown in FIG. 1 and FIG. 2. A typical example of an intraocular surgery is explained in FIG. 3, FIG. 4 and FIG. 5.

FIG. 1 is an exploded perspective view of the ophthalmologic model 1 of the present invention. It is shown that the ophthalmologic model 1 is constructed to be able to be connected or to be disconnected with sclera 2, stratum disjunctum 2' of sclera, cornea 3, central part 4 of capsula lentis, crystal lens 5, choroid coat 6, iris 7, Zinn's band 8, Schlemm's canal 9, angle trabecular 10, conjunctiva 11, corpus vitreum 12, sheet fastener 13, artificial intraocular lens 14, retina 15, conjuctival follicle 16, pedestal 17, buckle 18, silicone sponge 19, equatorial ring 20 in capsula lentis, excised piece 21 of iris, excised piece 22 of angle trabecular, excised piece 23 of sclera, scleral valve 24, incision parts 25 of conjunctiva. Materials of these components are not specifically restricted if it is an elastic material and it has great strength. For example, the material may be any of transparent or colorable silicone resin, polyurethane resin, fluorine resin, synthetic rubber, natural rubber or combination of these materials.

FIG. 2 is a whole perspective view of the ophthalmologic model 1 of the present invention. Contact portions of each ocular parts lying next to each other are adapted to engage with its concavity portion and convexity portion or by using sheet fastener 13 and so on, or are retained in a state of adhering tightly to each other with viscosity of sheet form of silicone resin, and are configured to be able to be connected or to be disconnected.

Figure 3:
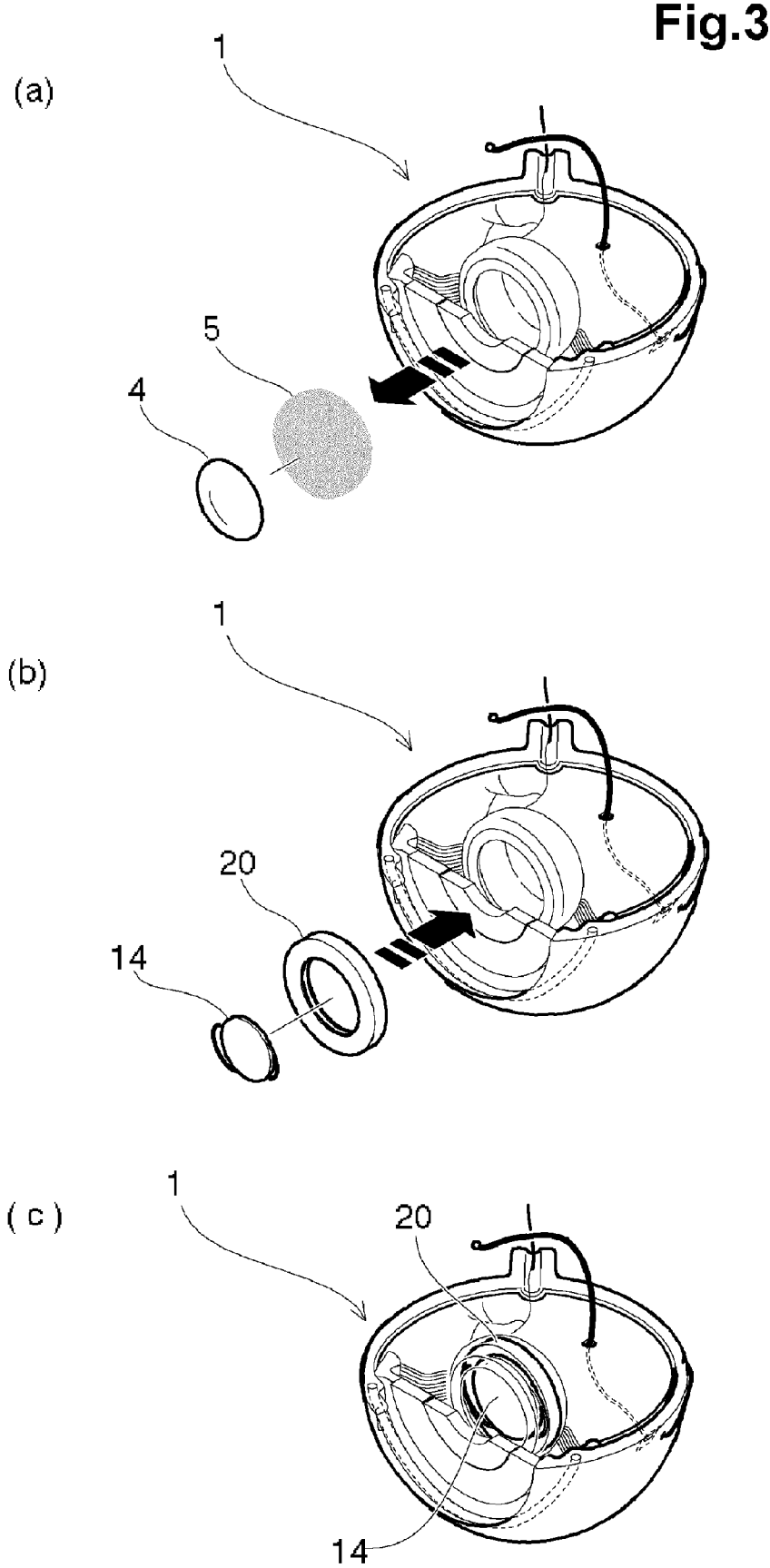
FIG. 3 is an illustrative drawing of the operative method by using the ophthalmologic model of the present invention.

FIG. 3 is an illustrative drawing of the operative method in a case of cataract by using the ophthalmologic model 1 of the present invention. FIG. 3(a) shows that it is easy to explain the state of operation to the patient wherein central part 4 of capsula lentis is removed, an ultrasonic equipment is inserted into capsula lentis, and cloudy crystal lens 5 is removed by crushing and suction. FIG. 3(b) shows a state of operation wherein artificial lens 14 is inserted and inlayed into capsula lentis. By the way, development of a technique is progressing now, wherein an equatorial ring 20 in capsula lentis is firstly inserted to be inlayed into capsula and then a loop of artificial intraocular lens 14 is inserted into a channel on inner surface of the equatorial ring 20 in capsula lentis. By this technique, onset of aftercataract is reduced more than that in case wherein only artificial lens 14 is inserted. By using the ophthalmologic model 1 of the present invention, these new technique can be responded. FIG. 3(c) shows that an inlayed state of an equatorial ring 20 in capsula lentis and artificial intraocular lens 14 into capsula lentis after surgery can be explained easily.

Figure 4:
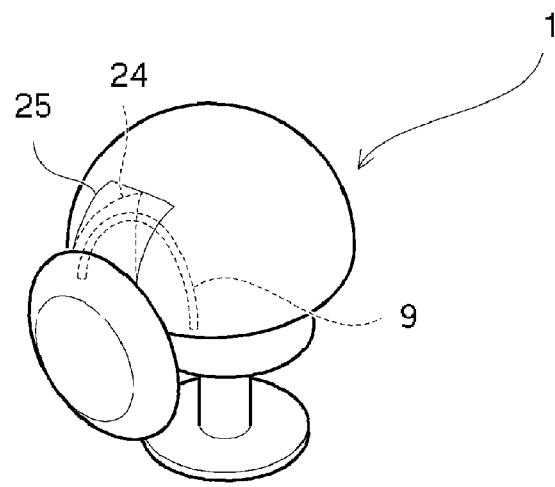
FIG. 4 is an illustrative drawing of the operative method by using the ophthalmologic model of the present invention.
Figure 4:
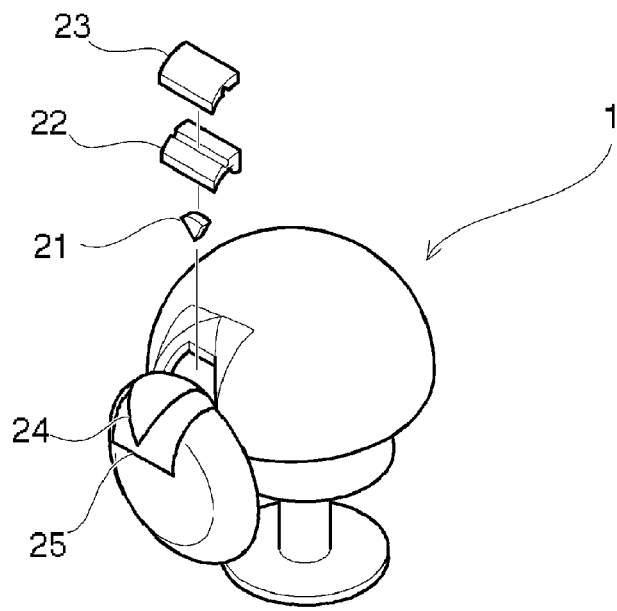
Figure 4:
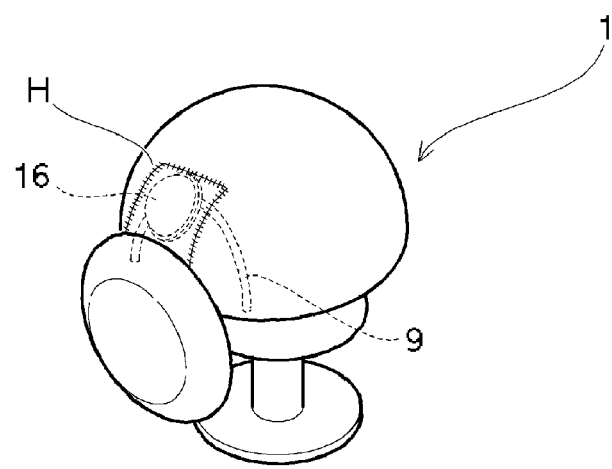

FIG. 4 is an illustrative drawing of the operative method in a case of glaucoma by using the ophthalmologic model 1 of the present invention. FIG. 4(a) shows an operating part of trabeculectomy method which is a typical operative method of various glaucoma surgeries, and shows a state of operation wherein conjunctiva 11 is incised into inverted U and half layer of sclera 2 is incised into inverted V. FIG. 4(b) shows a dissection part in the operative method and a state of operation wherein scleral valve 24 and incision parts 25 of conjunctiva which are incised and stripped off and opened, a portion of sclera under them is incised squarely, a portion of angle trabecular 10 at deepest position of sclera is incised at the same time, a portion of iris which is positioned inside of eyeball is incised through the opened part. FIG. 4(c) shows a state of suture after surgery and shows ability of explanation of operative method (suture lysis) wherein conjuctival follicle 16 is formed and additionally regulation of intraocular fluid volume from incision part to extraocular part in a period of few days after surgery is performed by cutting off arbitrarily a number of suture H by using laser from outside. Furthermore, it can also respond to explanation of trabeculectomy method wherein angle trabecular 10 is incised by inserting an apparatus into Schlemm's canal 9.

Figure 5:
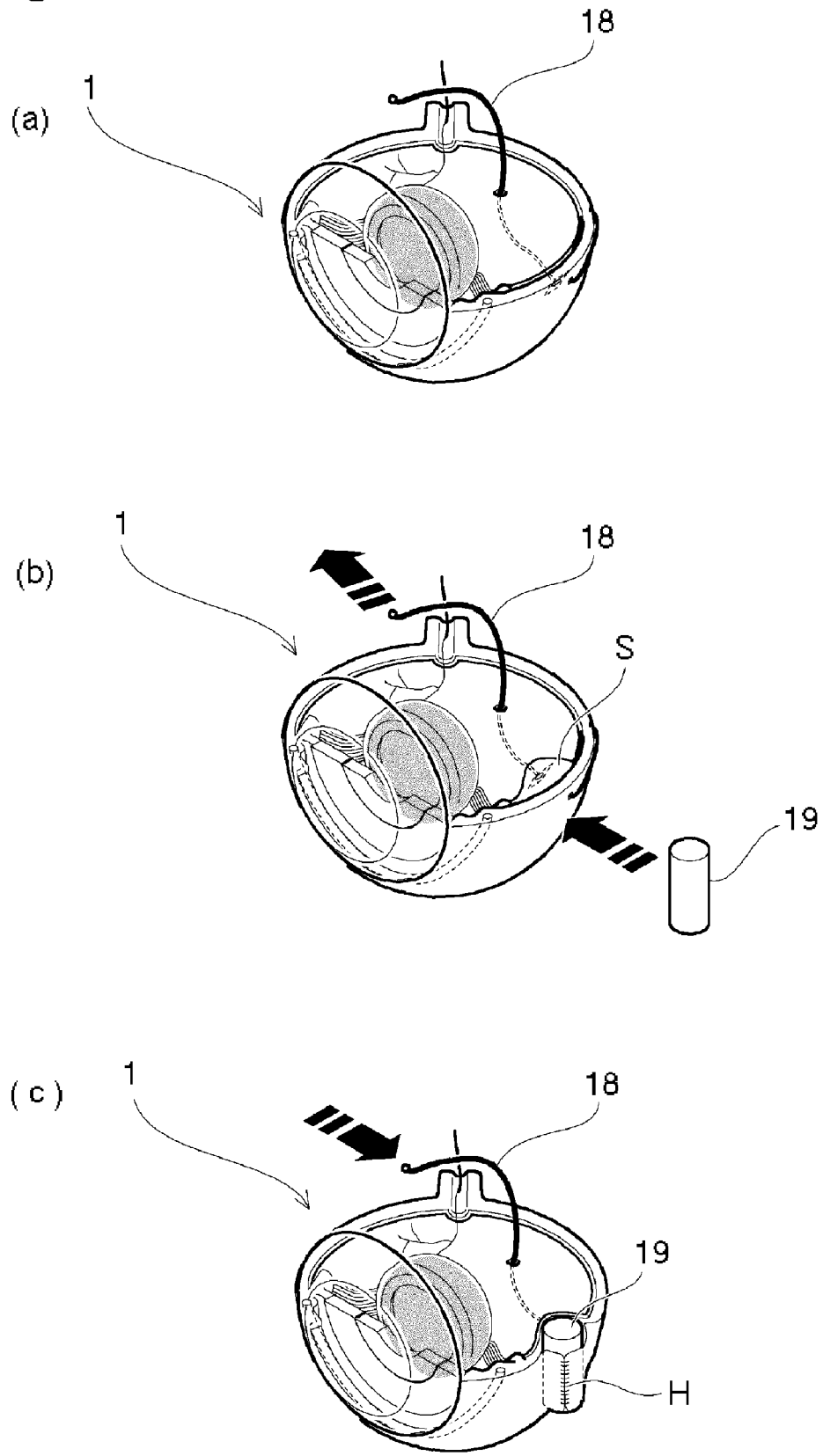
FIG. 5 is an illustrative drawing of the operative method by using the ophthalmologic model of the present invention.

FIG. 5 is an illustrative drawing of the operative method in a case of retinal detachment by using the ophthalmologic model 1 of the present invention. FIG. 5(a) shows an operating part in the case of a suprascleral encircling procedure. FIG. 5(b) explains causality of onset of retinal detachment and shows detachment by vitreoretinal traction which is a most dominating cause in various causes. A state wherein retinal detachment S is occurred, is replicated by that a portion of corpus vitreum 12 is retracted by binding with buckle 18, retina 15 and choroid coat 6 are dragged, and state of detachment S from retina 15 is transformed by simulation. FIG. 5(c) shows a state of suture after surgery. It replicates a state wherein silicone sponge 19 is put on sclera 2, and is immobilized strongly with pressure by suture thread over there in order to transform sclera, and sclera is caved inside of eyeball. By the way, though it is not shown in drawing, as mentioned above, it is possible to explain an embodiment using filling apparatus which can fill up fluid substance such as a gas having low specific gravity. When an embodiment as this is adopted, intraocular pressure is elevated by said filling apparatus in order to be able to explain a state wherein detachment is cured. Furthermore, it is possible to explain comprehensively the state wherein by translocation of eye after surgery, filled substance inside of eyeball will rise to direction (right above) to counter gravitational forces and press a portion of retina exerted inside by aforementioned buckle and a portion of retina which is not enough healed up after surgery, so as to cure retinal detachment.

By the way, FIG. 3, FIG. 4, and FIG. 5 are only an exemplification of an operative method in the case of representative intraocular disease and are not restricted to these operative methods. Needless to say, it is possible to explain all operative methods.

As mentioned above, the present invention is proposed as the ophthalmologic model for explanation for the patient of intraocular disease. However, the invention can be used widely for explanation tools of operative methods or learning materials and so on by using soft and ductile resin material for human anatomy models in all parts constructing human body. Especially, in the case of preliminary meeting of surgery operation, it is possible to provide human anatomy models using soft and ductile resin material in order to simulate a surgery in face of actual surgery parts, as an instrumental for unifying decision of operation staffs beforehand by separately appending affirmation of position and part of disease, method of surgery, and procedures, and a sample of operation parts.

What is claimed is:

1. An ophthalmologic model comprising:
   components thereof formed of a soft ductile resin, transparent or colored and patterned, wherein said components include model sclera, stratum disiunctum of sclera, cornea, central part of capsula lentis, lens, choroid coat, iris, Zinn's band, Schlemm's canal, trabecular, conjunctiva, corpus vitreum, sheet fastener, artificial intraocular lens, retina, conjuctival follicle, pedestal, buckle, silicone sponge, equatorial ring in capsula lentis, excised piece of iris, excised piece of trabecular, excised piece of sclera, scleral valve, and incision parts of conjunctiva,
   wherein each component thereof except the sheet fastener, the pedestal, the buckle and the silicone sponge is in a solid form or a sheet form that is freely attachable and removable by using viscosity, a concavo-convex part or a sheet fastener and can be deformed by outside pressure.

2. The ophthalmologic model described in claim 1, characterized by that the ductile resin comprises a silicone resin, a polyurethane resin, a fluorine resin, a synthetic rubber, a natural rubber or a combination of these resins.

* * * * *